United States Patent [19]

Horneman

[11] Patent Number: 5,301,884

[45] Date of Patent: Apr. 12, 1994

[54] AUTOMATIC FIBER OPTIC QUADRUPOLE COIL WINDING MACHINE

[75] Inventor: Erwin Horneman, Brampton, Canada

[73] Assignee: Litton Systems, Inc., Beverly Hills, Calif.

[21] Appl. No.: 806,950

[22] Filed: Dec. 16, 1991

[51] Int. Cl.⁵ .................................. B21F 3/02
[52] U.S. Cl. .................................. 242/7.09
[58] Field of Search .............. 242/7.03, 7.09, 7.14; 29/605

[56] References Cited

U.S. PATENT DOCUMENTS

| | | | |
|---|---|---|---|
| 3,801,029 | 4/1974 | Malburg | 242/7.09 |
| 4,310,799 | 1/1982 | Hutchison et al. | 324/319 |
| 4,449,291 | 5/1984 | Rothman | 29/605 |
| 4,856,900 | 8/1989 | Ivancevic | 356/350 |
| 4,928,894 | 5/1990 | Ohno et al. | 242/7.09 |

OTHER PUBLICATIONS

"Compensation of Linear Sources of Non-reciprocity in Sagnac Interferometers," SPIE Proceedings, *Fiber Optic and Laser Sensors*, vol. 412, pp. 268–271, 1983.

Primary Examiner—Katherine Matecki
Attorney, Agent, or Firm—Lynn & Lynn

[57] ABSTRACT

A clamp is connected to a base for retaining a reel in a predetermined position relative to the base. A pair of winding heads are mounted to the base so that the winding heads face each other with the reel retained between the winding heads. Each winding head includes a corresponding fiber supply spool. A coil of optical fiber is formed on the reel by alternately winding predetermined lengths of the fiber from each fiber supply spool onto the reel. The coil is formed by rotating the first winding head in a first direction relative to the reel to wind fiber from the first supply spool onto the reel while holding the second winding head stationary relative to the reel to prevent fiber from the second supply spool from being wound onto the reel while fiber from the first supply spool is being wound on the reel. The winding heads are moved in translational motion relative to the reel while the winding heads are rotated to wind the fiber in even layers on the reel.

5 Claims, 9 Drawing Sheets

AUTOMATIC FIBER OPTIC QUADRUPOLE COIL WINDING MACHINE

BACKGROUND OF THE INVENTION

This invention relates to apparatus and methods for forming coils of optical fiber. In particular, this relates to apparatus and methods for forming sensing coils for fiber optic rotation sensors. Still more particularly, this invention relates to apparatus and methods for forming quadrupole-wound fiber optic sensing coils.

It has been found that a fiber optic rotation sensor that meets the performance requirements for guidance and navigation systems should have a sensing coil having quadrupole-wound symmetry. Quadrupole-wound symmetry is attained by dividing a continuous length of optical fiber into two or more source spools and winding optical fiber from each spool onto a reel. A single layer of the optical fiber coil is first wound on the reel. Then alternating dual layers of optical fiber are wound from each source spool onto the reel. A dual layer is two layers arranged with an outer layer formed over an inner layer such that the wrapping of the outer layer ends where the inner layer begins. The optical fiber is then wound onto the reel until selected equal lengths from each source spool are placed on the reel.

The quadrupole winding pattern preserves symmetry about the center of the fiber and, therefore, decreases phase errors due to changing thermal conditions. Phase errors caused by thermal gradients in fiber optic rotation sensors are discussed by N. J. Frigo, "Compensation of Linear Sources of Non-reciprocity in Sagnac Interferometers," *SPIE Proceedings, Fiber Optic and Laser Sensors*, Vol. 412, pp. 288-271.

The basic structure of fiber optic coils having quadrupole-wound symmetry is explained in U.S. Pat. No. 4,856,900, which issued Aug. 15, 1989 to Ivancevic. U.S. Pat. No. 4,856,900 is assigned to Litton Systems, Inc. The disclosure of U.S. Pat. No. 4,856,900 is hereby incorporated by reference into the present disclosure.

A coil formed with quadrupole-wound symmetry has the property that lengths of the fiber which are equidistant from the center of the spool are in such close proximity that they will have essentially the same temperature. Therefore, temperature gradients are symmetrical about the center of the quadrupole-wound coil. Phase errors due to the Shupe effect are, therefore, also symmetrical such that Shupe effect phase errors on opposite sides of the center of the coil are of opposite sign and tend to negate each other.

SUMMARY OF THE INVENTION

The apparatus according to the present invention for winding a multilayered coil of an optical fiber or the like on a reel comprises a base and a clamp connected to the base for retaining the reel in a predetermined position. A first winding head is connected to the base, and a second winding head is connected to the base such that the reel is between the first and second winding heads. Each winding head includes a corresponding fiber supply spool that contains a selected length of an optical fiber. The present invention further includes motors and controls for alternately winding predetermined lengths of the fiber from each fiber supply spool onto the reel.

The apparatus according to the present invention preferably further comprises means for rotating the first winding head in a first direction relative to the reel to wind fiber from the first supply spool onto the reel and means for holding the second winding head stationary relative to the reel to prevent fiber from the second supply spool from being wound onto the reel while fiber from the first supply spool is being wound on the reel.

The invention further preferably includes means for moving the winding heads in translational motion relative to the reel while the winding heads are rotated to wind the fiber in even layers on the reel.

DESCRIPTION OF THE PREFERRED EMBODIMENT

Figure 1A:
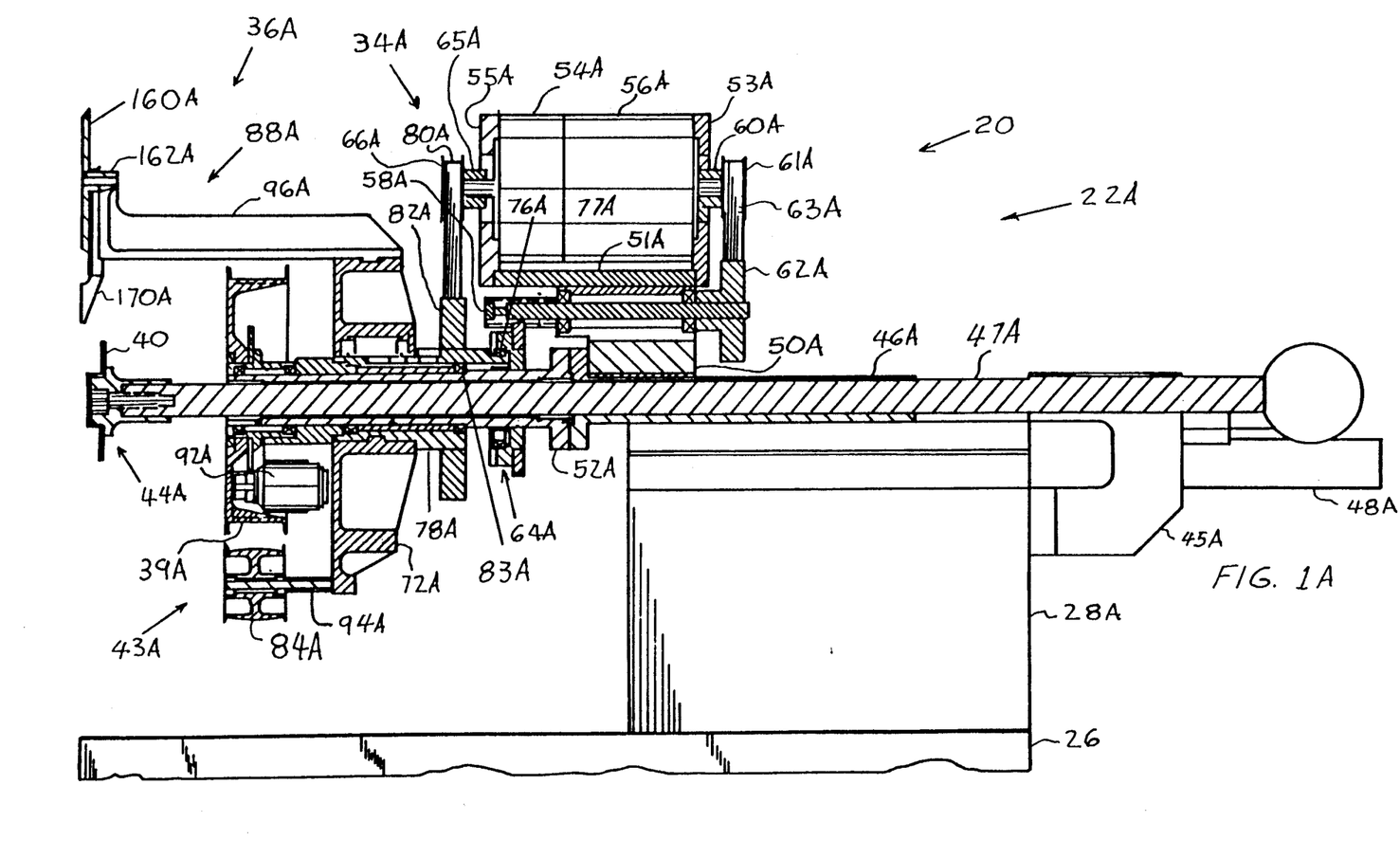
FIG. 1A illustrates a right-hand section of a fiber optic quadrupole coil winding machine according to the present invention showing a base plate, a riser block, a motorized linear stage, and a winding head.
Figure 1B:
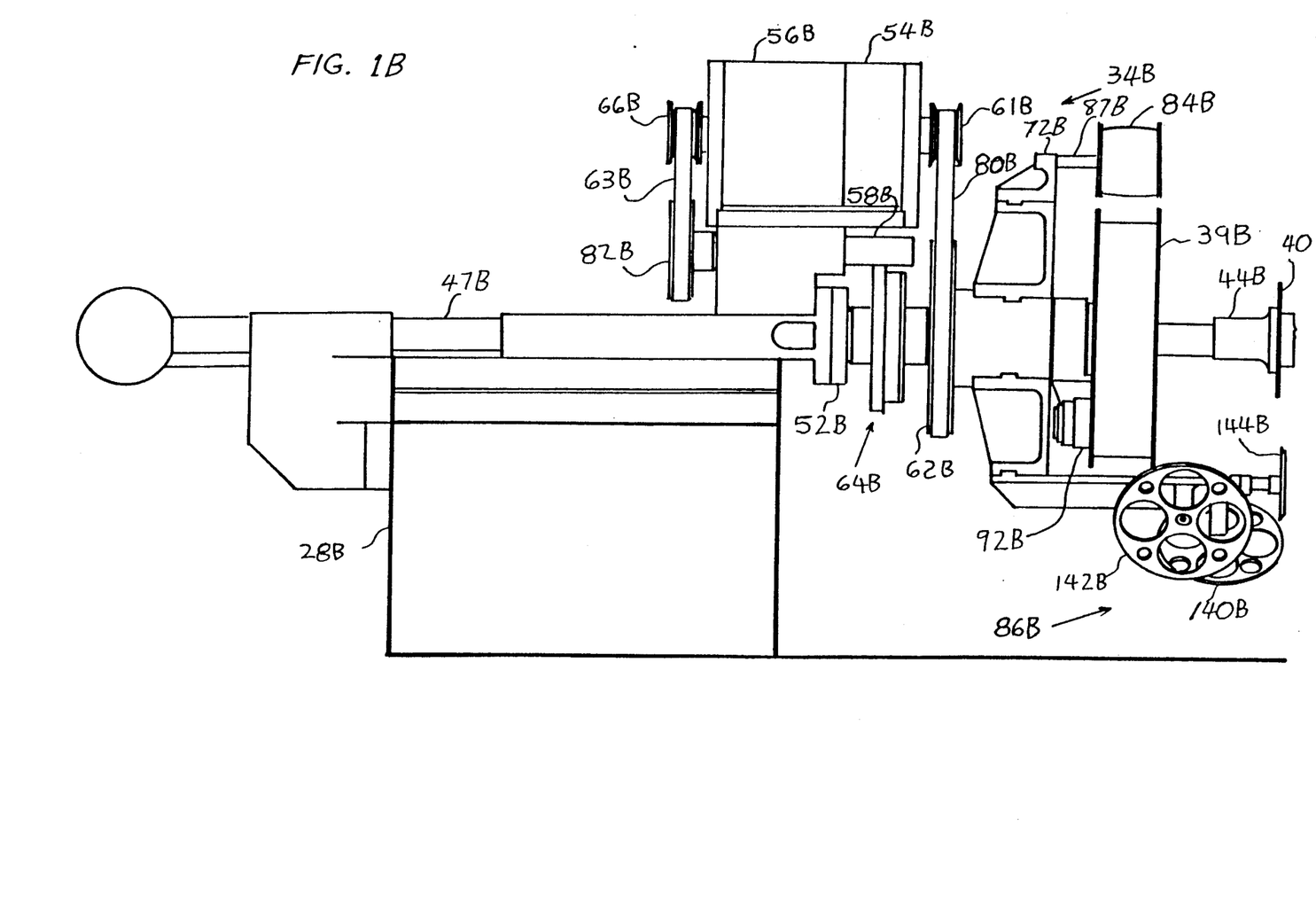
FIG. 1B illustrates a left-hand section of a fiber optic quadrupole coil winding machine according to the present invention showing a base plate, a riser block, a motorized linear stage, and a winding head.

A fiber optic quadrupole coil winding machine 20 according to the present invention includes a right-hand section 22A shown in FIG. 1A and a left-hand section 22B shown in FIG. 1B. The right-hand section 22A and the left-hand section 22B are essentially identical. Therefore, only the structure of the right-hand section 22A is explained in detail. FIG. 1A is a partial cross-sectional view, and FIG. 1B is an elevation view. The components of FIG. 1B are described where appropriate for understanding the structure and method of operation of the present invention. Components in the right-hand section 22A will be referenced with a numeral having an "A" appended thereto. It is to be understood that the left-hand section 22B includes the same components and operates in the same fashion as the right-hand section 22A. When reference is made to a component in the left-hand section 22B, it will have the same reference numeral as the corresponding component in the right-hand section 22A, but with a "B" appended thereto.

The fiber optic quadrupole coil winding machine 20 preferably includes a base 26 with a pair of riser blocks 28A and 28B connected to the base 26. The riser blocks 28A and 28B face one another and preferably are mounted on a common center line. The riser blocks 28A and 28B support the other mechanical components of the fiber optic quadrupole coil winding machine 20 above the base 26 as explained subsequently.

Figure 4:
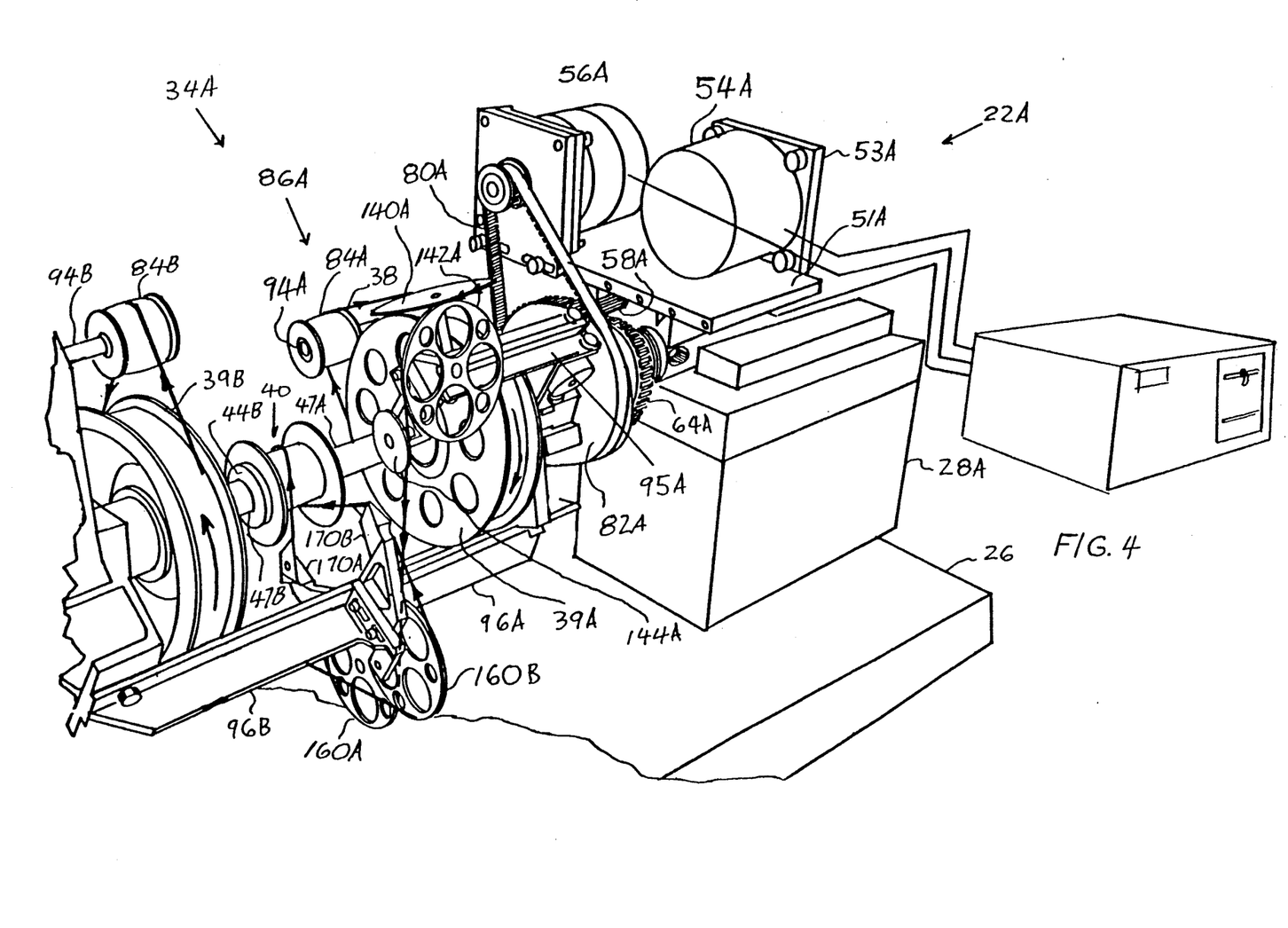
FIG. 4 is a perspective view showing optical fiber being wound from the right-hand fiber supply spool to form a first portion of a dual layer optical fiber coil.

Referring to FIGS. 1A, 1B and 4, the right-hand section 22A comprises a linear stage assembly 32A and a winding head 34A. The linear stage assembly 32A is mounted to the riser block 28A. The linear stage assembly 32A and the winding head 34A cooperate to wind predetermined lengths of an optical fiber 38 from a fiber supply spool 39A onto a reel 40. The left-hand section 22B includes a linear stage assembly 32B and a winding head 34B that wind predetermined lengths of the optical fiber 38 from a fiber supply spool 39B onto the reel 40. The right-hand section 22A and the left-hand section 22B cooperate to form on the reel 40 a coil 42 shown in FIG. 11, having quadrupole-wound symmetry.

Referring to FIG. 1A, the linear stage assembly 32A is mounted to the riser block 28A. The linear stage assembly 32A includes a fiber coil clamp assembly 43A that is mounted to the riser block 28A by a clamp support 45A. The fiber coil clamp assembly 43A includes a shaft 47A and a fiber coil clamp 44A mounted to an end of the shaft 47A. As shown in FIGS. 1A, 1B and 4-6, one side of the reel 40 is mounted to the fiber coil clamp 44A. The other side of the reel 40 is mounted to the fiber coil clamp 44B in the left-hand section 22B. The two fiber coil clamps 44A and 44B hold the reel 40 in compression to prevent it from moving relative to the base 26 while the optical fiber coil 42 is being formed.

Still referring to FIG. 1A, the linear stage assembly 32A is oriented so that it may translate along a line parallel to the longitudinal axis of the right-hand section 22A. A linear stage drive motor 48A is mounted to the clamp support 45A to provide means for moving the winding head 34A in translational motion relative to the base 26.

A primary support plate 46A is mounted to the upper portion of the linear stage assembly 32A. The components of the winding head 34A are mounted to the primary support plate 46A. A bearing block assembly 50A is mounted to the primary support plate 46A. A winding head support 52A is mounted to the primary support plate 46A to the left of the bearing block assembly 50A as shown in FIG. 1A. FIG. 1B shows an elevation view of the winding head support 52B, which has the same structure as the winding head support 52A.

The bearing block assembly 50A carries a mounting plate 51A. A first motor mounting plate 53A and a second motor mounting plate 55 are connected to the mounting plate 51A. A rotator motor 54A is mounted to the motor mounting plate 55A and a fiber guide motor 56A is mounted to the motor mounting plate 53A. The fiber guide motor provides power to a guide drive shaft 60A, which drives a pulley 61A. A guide drive pinion 58A passes through the bearing block assembly 50A. A guide drive pulley 62A is mounted to the guide drive pinion 58A. A belt 63A is mounted on the pulley 61A and the guide drive pulley 62A for transferring rotation of the guide drive motor 56A to the guide drive pinion 58A.

A guide drive nut assembly 64A is mounted to the winding head support 52A. The shaft 47A passes through the guide drive nut assembly 64A. The guide drive nut assembly 64A meshes with the guide drive pinion 58A.

Figure 7:
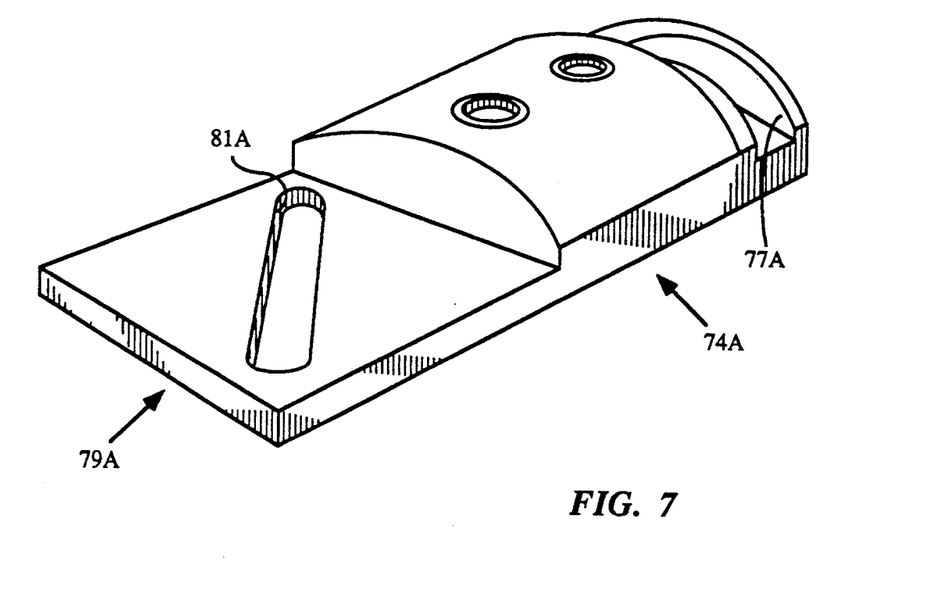
FIG. 7 is a perspective view of a cross slide actuator that may be included in a fiber optic quadrupole coil winding machine according to the present invention.
Figure 8:
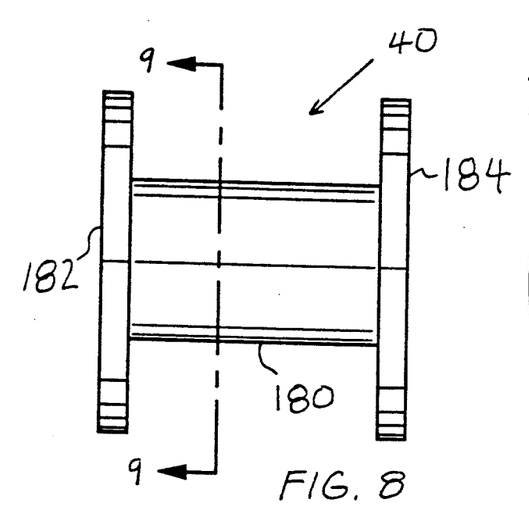
FIG. 8 illustrates a reel around which optical fiber may be wound to form a quadrupole-wound fiber optic coil for a fiber optic rotation sensor.
Figure 9:
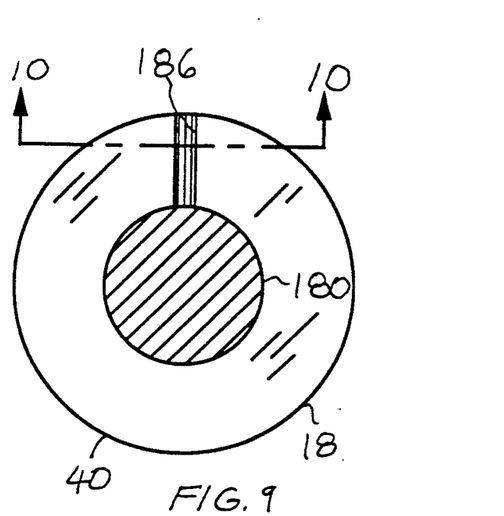
FIG. 9 is a cross-sectional view taken along line 9—9 of FIG. 8 to show a radial slot formed in an end face of the reel of FIG. 8.
Figure 10:
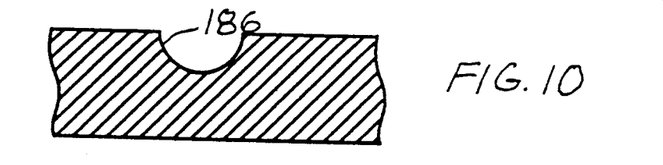
FIG. 10 is a cross-sectional view taken along line 10—10 of FIG. 9 to further illustrate the radial slot in an end face of the reel of FIG. 8.

The winding head 34A includes a cross slide actuator 74A shown in FIG. 7. A ball-race 76A is mounted between a transverse slot 77A in the cross slide actuator 74A and the guide drive nut assembly 64A. Referring to FIG. 7, the cross slide actuator 74A includes a 45° slot 81A near an end 79A opposite from the slot 77A. Referring again to FIG. 1A, the 45° slot 81A fits around a single ball race 83A attached to the upper portion of the cross slide actuator 73A. The slot 81A makes an angle of 45° with the longitudinal axis of the shaft 47A and the coil winding machine 20.

The inner part of the cross slide actuator 74A is secured to a rotator 78A that is mounted on the winding head support 52A. Any rotation of the fiber guide motor shaft 60A is converted directly into a proportional linear movement of the cross slide actuator 74A.

Referring to FIG. 1A, the rotator 78A is mounted on the winding head support 52A. As shown in FIGS. 1A and 4–6, the rotator motor 54A has an output shaft 65A that drives an output shaft pulley 66A. The rotator 78A is driven by the rotator motor 54A through a small timing belt 80A that passes over the output shaft pulley 66A and a rotator drive pulley 82A. The arrangement of the corresponding belts 63B and 80B and the pulleys 61B, 62B, 66B and 82B may be seen in FIG. 1B.

The rotator 78A carries all of the fiber guide systems included in the fiber optic quadrupole coil winding machine 20. The fiber supply spool 39A is mounted to the rotator 78A. The fiber guide assembly 36A guides the optical fiber 38 from the fiber supply spool 39A to the reel 40.

Figure 2:
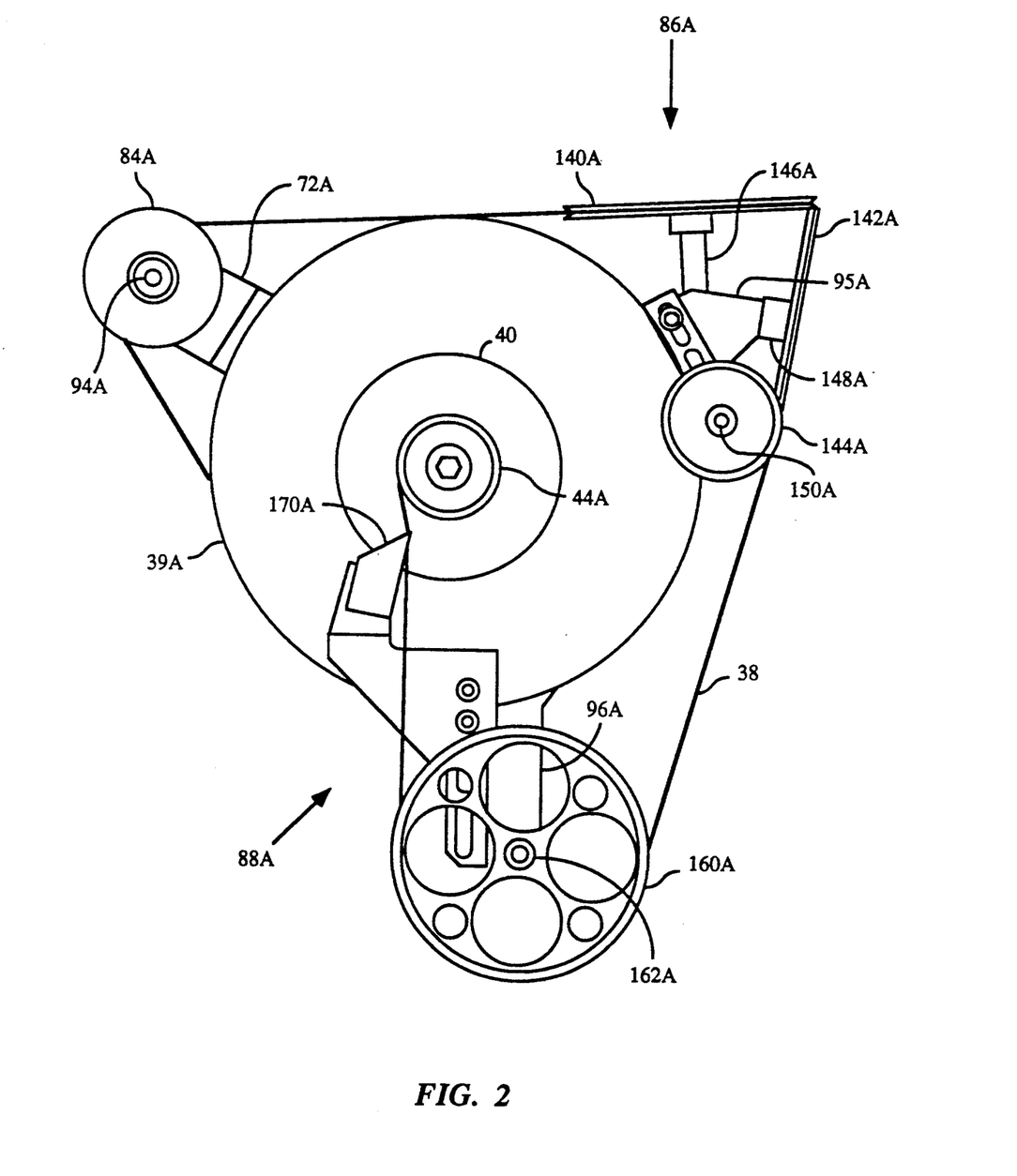
FIG. 2 is an elevation view showing optical fiber being routed from the fiber supply spool of FIGS. 1A and 1B to a reel for forming a quadrupole-wound coil.

Referring to FIG. 2, the fiber guide assembly 36A includes a transition roller 84A, an offset fiber guide assembly 86A and a final fiber guide assembly 88A that are arranged around the shaft 47A angularly separated by about 120°.

Referring to FIGS. 1A and 2, the transition roller 84A is mounted to the rotator 78A by a shaft 94A that is connected to a support arm 72A. The support 72A is connected to the rotator 78A. FIG. 1B shows the connection of the transition roller 84A to a shaft 94B. The transition roller 84A and the fiber supply spool 39A are mounted on parallel axes. The transition roller 84A is spaced apart from the supply spool 39A so that the fiber 38 may be unwound from the supply spool 39A without becoming entangled with other components of the fiber optic quadrupole coil winding machine 20.

Referring to FIGS. 2 and 4, the offset fiber guide assembly 86A includes rollers 140A, 142A and 144A. As shown in FIG. 2, the offset fiber guide assembly 86A is mounted to a support arm 95A. Referring to FIG. 1B, the left-hand section 22B includes an offset fiber guide assembly 86B that is connected to a support arm 95B that is essentially identical to the support arm 95A. The rollers 140A, 142A and 144A are mounted on shafts 146A, 148A and 150A, respectively. The shafts 146A, 148A and 150A extend from the support arm 95A to provide selected axes of rotation for the rollers 140A, 142A and 144A.

The final fiber guide assembly 88A is mounted on a support arm 96A that is connected to the rotator 78A. The final fiber guide assembly 88A includes a final fiber guide roller 160A that is mounted on a shaft 162A, which extends from the support arm 96A. A final fiber guide 170A extends from the support arm 96A to location near the reel 40. The fiber 38 passes from the end of the final fiber guide 170A directly to the reel 40.

A fiber tension motor 92A is connected to the winding head support 52A. The fiber tension motor 92A is geared to the free wheeling fiber supply spool 39A, which is located on the end of the winding head support 52A on suitable bearings.

Referring to FIG. 4, the invention may include a central control device 100 that provides control signals to all the motors 48A, 48B, 54A, 54B, 56A, 56B, 92A and 92B to control the coil winding operations.

During coil winding operations, the distance between the fiber layers being wound and the final fiber guides 170A and 170B is maintained by moving the final fiber guides 170A and 170B out by the appropriate amounts. This distance is maintained while the fiber optic quadrupole coil winding machine 20 is in operation.

During coil winding, one of the coil clamps 44A and 44B is fixed in place while the other preferably is spring loaded against the fixed coil clamp. The spring tension provides adequate force to hold the coil in place during the winding process.

Figure 11:
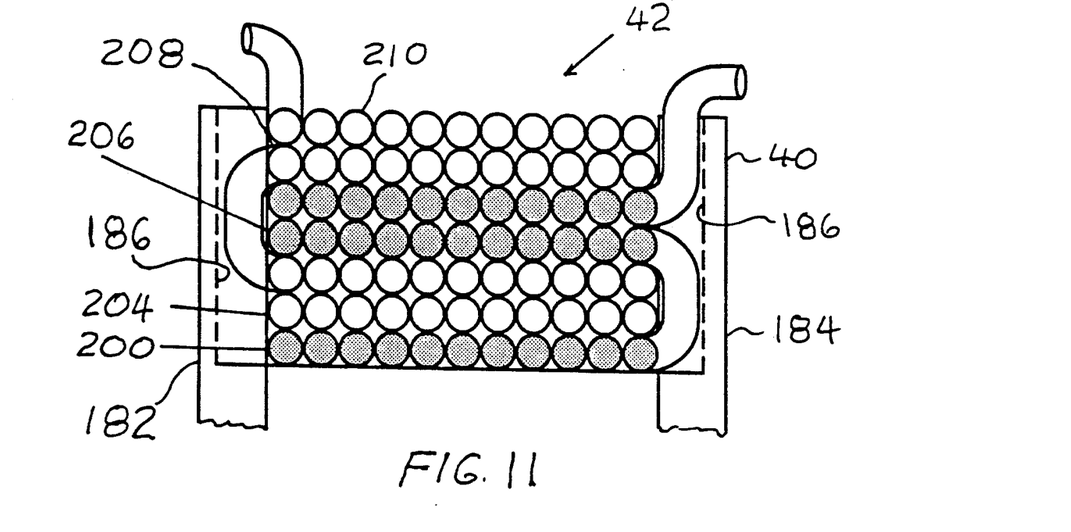
FIG. 11 illustrates a quadrupole-wound coil of optical fiber formed using apparatus and methods of the present invention.

Referring to FIGS. 8-11, the reel 40 includes a cylindrical drum 180 and a pair of end flanges 182 and 184 mounted to opposite ends of the drum 180. Each end flange 182 and 184 has a radial groove 186 therein that extends from the drum 180 to the outer edge of the flanges 182 and 184. As shown in FIG. 11, these radial grooves are used to route the fiber 38 from the supply spools 39A and 39B around the inner layers of optical fiber wound on the drum 180 to form new layers without distorting the coil at the ends adjacent the flanges 182 and 148.

Method of Operation

Figure 5:
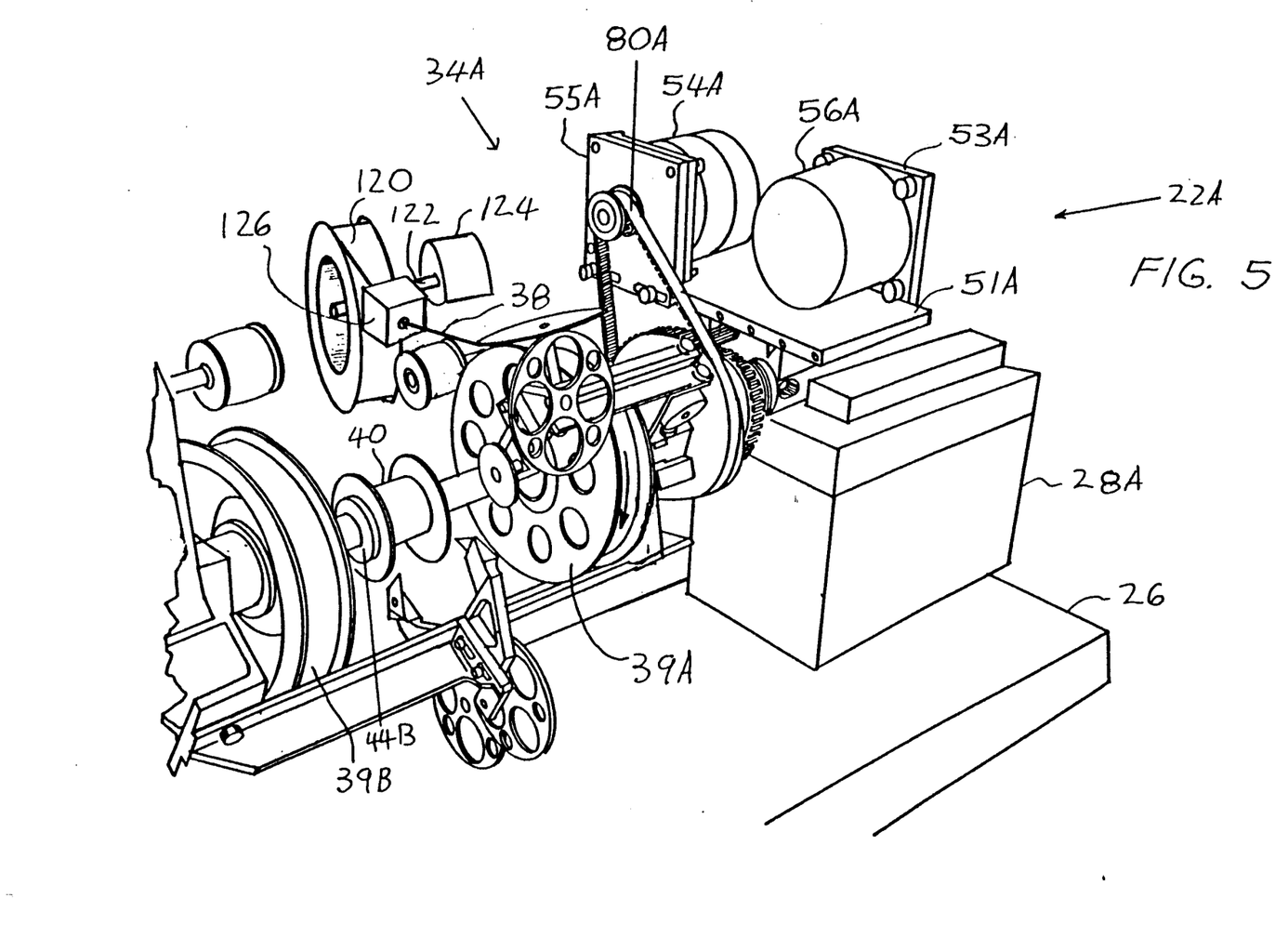
FIG. 5 is a perspective view showing optical fiber being wound from a fiber supply spool to the right-hand fiber supply spool.

First, the entire measured fiber length that will be used to form the coil 42 must be wound onto one of the fiber supply spools 39A or 39B. Referring to FIG. 5, a spool 120 containing the optical fiber 38 is placed on a spindle 122. The spindle 122 has its own torque control and a drive motor 124. The free end of the optical fiber 38 is then fed through a counter 126 and attached to the fiber supply spool 39A. The winding head 34A is rotated into a position to create a clear path between the counter 126 and the supply spool 39A.

To create even layers on the fiber supply spool 39A, the winding head 34A is moved axially back and forth while the fiber 38 is wound until the desired length of the optical fiber 38 is on the fiber supply spool 39A. The winding of the optical fiber 38 onto the fiber supply spool 39A is accomplished by differential torque between the tension motor 92A of the fiber supply spool 39A and the spindle 122 which is connected to the drive motor 124.

Alternatively, initial winding of optical fiber 38 from the shipping spool 120 onto one supply spool 39A may be done on a separate conventional bobbin winding machine (not shown), and the wound supply spool may then be mounted onto the fiber optic quadrupole coil winding machine 20.

Figure 6:
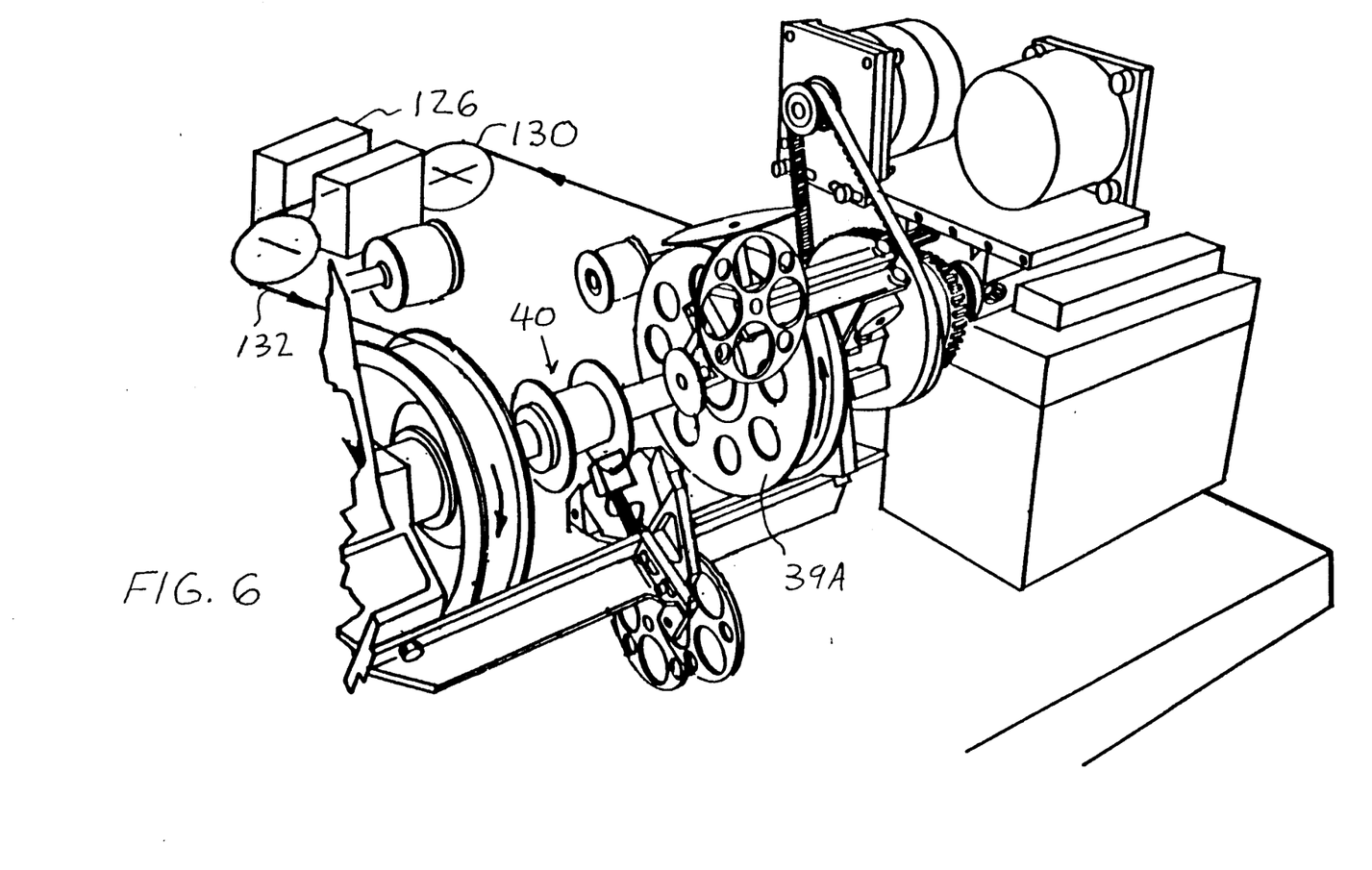
FIG. 6 is a perspective view showing loading of optical fiber from the right-hand fiber supply spool to the left hand fiber supply spool.

Referring to FIG. 6, the loose fiber end from the first supply spool 39A is then routed over two externally mounted guide wheels 130 and 132 and the counter 126 to the second supply spool 39B. The optical fiber end is secured to the second fiber supply spool 39B so that half of the fiber 38 may be wound onto the second fiber supply spool 39B. Both the first and second fiber supply spools 39A and 39B, respectively, are moved axially as the fiber 38 is wound from the first fiber supply spool 39A onto to the second fiber supply spool 39B to form even layered coils on the second fiber supply spool 39B. The torque required to wind the fiber 38 from the first fiber supply spool 39A to the second fiber supply spool 39B is achieved by controlling the torque of the fiber tension motor 92A and the torque of a similar fiber tension motor 92B that is connected to the fiber supply spool 39B.

After the second fiber supply spool 39B has been loaded with half of the optical fiber 38 to be wound onto the reel 40, the counter 126 is removed from the optical fiber 38. The electrical current in both the fiber tension motors 92A and 92B is reduced to a low value to prevent accidental fiber breakage.

Figure 3:
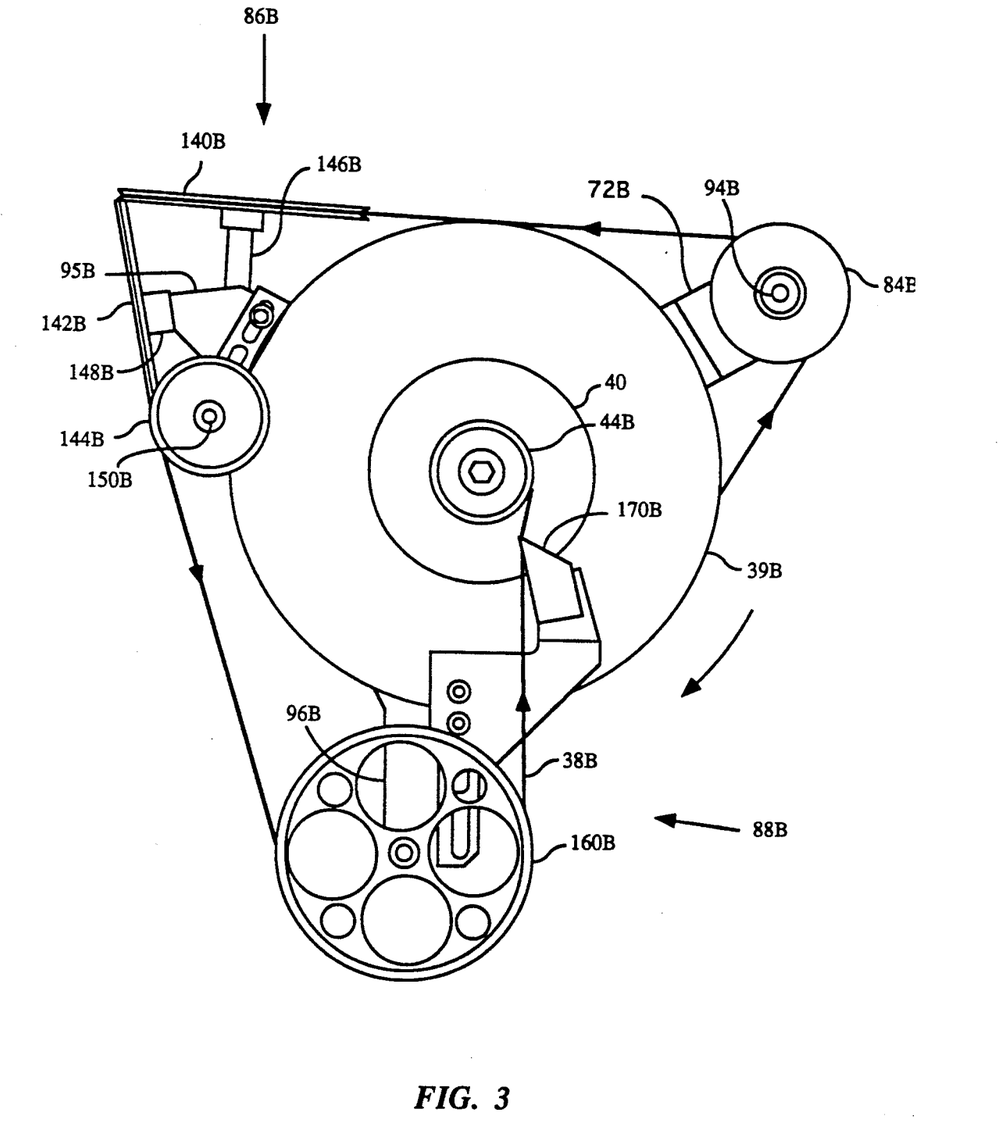
FIG. 3 is an elevation view showing optical fiber being wound from the left-hand fiber supply spool of FIGS. 1A and 1B onto a reel for forming a quadrupole-wound coil.

The optical fiber 38 is routed from the spool 39A over the complete guide assembly 36A as shown in FIGS. 2-4. The fiber 38 is routed from the fiber supply spool 39A over the transition roller 84A to the offset fiber guide assembly 86A.

The transition roller 84A has its axis parallel to that of the fiber supply spool 39A and provides space between the fiber supply spool 39A and the fiber 38 so that it can pass over the first roller 140A in the offset fiber guide assembly 86A. The axis of rotation of the first transition roller 140A is at an angle to that of the fiber supply spool 39. The optical fiber 38 is then passed over the second offset roller 142A. The axis of rotation of the second offset roller 142A is generally perpendicular to that of the first offset roller 140A. The optical fiber 38 then is passed over the final fiber guide roller 160A and routed to the final fiber guide, 170A from which the optical fiber is dispensed to the reel 40.

The portion of the fiber 38 that is mounted on the supply spool 39B is arranged in a manner similar to that described above so that the final fiber guide 170B also delivers the fiber 38 to the reel 40.

The empty reel 40 is placed on the fixed fiber coil clamp 44A and securely held in place by the spring loaded second clamp 44B, which is preferably spring-biased toward the fixed fiber coil clamp 44A. The first winding head 34A is then rotated until the optical fiber 38, which runs from the final guide of the winding head 34A to the final guide of the second winding head 34B, touches the cylindrical surface of the reel 40 where the first layer of the optical fiber coil will be formed. Next, both winding heads 34A and 34B are moved until the optical fiber just touches the side flange of the reel 40.

After the optical fiber 38 is routed over both guide systems, the control device 100 provides signals to the fiber tension motors 92A and 92B so that their currents are set to predetermined values to produce a desired tension on the optical fiber 38. During coil winding, the fiber tension motor currents are decreased to account for the decrease in the diameters of the fiber layers in the first and second fiber supply spools 39A and 39B, which maintains nearly constant tension in the optical fiber 38.

Normally the fiber supply spools 39A and 39B will rotate in the same direction as the winding heads 34A and 34B but at a lower speed. This speed difference is due to the wound coil diameter being in most cases smaller that the diameters of the fiber supply spools 39A and 39B. If the coil being wound had the same diameter as the fiber supply spools 39A and 39B then they would not rotate about their own longitudinal axes. The motion of the rotator 78A alone would wind the optical fiber 38 from the fiber supply spools 39A and 39B onto the reel 40.

The first winding head 34A will then start rotating as shown in FIG. 2. When one turn of the optical fiber 38 is placed on the reel 40, the entire winding head 34A steps forward by a distance equal to the diameter of the optical fiber 38 before the next turn is wound onto the reel 40. This stepping of the winding head 34A between turns causes the optical fiber 38 to be placed on the reel 40 parallel to the end flanges 182 and 184 except for the short length of the transition between the turns. The winding and stepping steps are repeated until the base layer 200 is complete. The first winding head 34A then stops moving.

The second winding head 34B then starts to rotate as shown in FIG. 3. The second winding head 34B then forms the second layer 202 of the coil in essentially the same manner as the first winding head 34A formed the base layer 200 by stepping between each turn so that the turns are essentially parallel to the flanges. After the second winding head 34B forms the second layer, both final fiber guides are now adjacent the same flange of the reel 40. The second winding head 34B then reverses its stepping direction and forms the third layer 204 of the coil over the second layer. After a few turns of the third layer 204 are in place, the first winding head 34A may start the fourth layer 206, with both the first and second winding heads 34A and 34B stepping in the same direction. After the second winding head 34B completes the third layer 204, it must remain stationary while the first winding head 34A completes the fourth layer 206 and begins the fifth layer 208. After the first few turns of the fifth layer 208 are in place, the second winding head 34B may start forming the sixth layer 210, and both the first and second winding heads 34A and 34B will step in the direction opposite to the direction stepped in forming the third and fourth layers.

When all of the layers are placed on the reel 40, both the first and second winding heads 34A and 34B will both be adjacent one of the flanges 182 or 184. The ends of the fiber 38 must be secured to the flange before the reel 40 can be removed from the fiber optic quadrupole coil winding machine 20.

The structures and methods disclosed herein illustrate the principles of the present invention. The invention may be embodied in other specific forms without departing from its essential characteristics. The described embodiments are to to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. Apparatus for winding a multilayered coil of an optical fiber or the like on a reel, comprising:
   a base;
   a clamp connected to the base for retaining the reel in a predetermined position relative to the base; first and second linear stage assemblies mounted to the base, the first and second linear stage assemblies including:
   first and second fiber guide motors mounted to the base, the first and second fiber guide motors having corresponding first and second fiber guide motor shafts;
   means for converting rotation of the first and second fiber guide motor shafts into linear motion for translating the first and second linear stage assemblies, respectively along a longitudinal axis relative to the base;
   first and second rotator assemblies connected to the first and second linear stage assemblies for translational movement relative to the base, the first and second rotator assemblies including: first and second winding head support shafts; first and second fiber supply spools that are rotatably mounted to the first and second winding head support shafts, respectively;
   first and second transition roller support arms mounted to the first and second winding head support shafts, respectively;
   first and second transition rollers mounted to the first and second transition roller support arms, respectively and arranged to be adjacent the first and second fiber supply spools, the first and second transition rollers being mounted for rotation parallel to the first and second fiber supply spools, respectively to receive an optical fiber therefrom;
   first and second offset fiber guide assemblies connected to the first and second rotators, respectively, the first and second offset fiber guide assemblies including first and second pluralities of offset fiber guide rollers;
   first and second final fiber guide assemblies connected to the first and second rotators, respectively, the first and second pluralities of offset fiber guide rollers being arranged to direct the optical fiber from the first and second transition rollers to the first and second final fiber guide assemblies, respectively, the first and second final fiber guide assemblies including:
   first and second final fiber guide rollers for receiving the optical fiber from the first and second offset fiber guide assemblies, respectively; and
   first and second final fiber guides that receive the optical fiber from the first and second final fiber guide rollers, respectively and direct the optical fiber to the reel where the coil is to be formed.

2. The apparatus of claim 1 including first and second fiber tension motors that are geared to the first and second fiber supply spools, respectively for maintaining a predetermined tension in the optical fiber as it is dispensed from the first and second fiber supply spools.

3. The apparatus of claim 1, further comprising:
   means for rotating the first winding head in a first direction relative to the reel to wind fiber from the first supply spool onto the reel; and
   means for holding the second winding head stationary relative to the reel to prevent fiber from the second supply spool from being wound onto the reel while fiber from the first supply spool is being wound on the reel.

4. The apparatus of claim 1, further comprising:
   means for moving the first and second winding heads in translational motion relative to the reel while the first and second winding heads are rotated to wind the fiber in even layers on the reel.

5. The apparatus of claim 1 including means for controlling the first and second winding heads to begin the coil by forming on the reel a first layer of optical fiber from a first one of the fiber supply spools and by adding to the reel alternating double layers of the optical fiber from the two fiber supply spools.

* * * * *